(12) United States Patent
Husbands et al.

(10) Patent No.: US 7,814,462 B2
(45) Date of Patent: Oct. 12, 2010

(54) METHODS AND APPARATUS FOR PARALLEL EXECUTION OF A PROCESS

(75) Inventors: Parry Jones Reginald Husbands, Albany, CA (US); Long Yin Choy, Hong Kong (CN); Alan Edelman, Newton, MA (US); Eckart Jansen, Belmont, MA (US); Viral B. Shah, Goleta, CA (US)

(73) Assignees: Massachusetts Institute of Technology, Cambridge, MA (US); The Regents of the University of California, Oakland, CA (US)

( * ) Notice: Subject to any disclaimer, the term of this patent is extended or adjusted under 35 U.S.C. 154(b) by 1403 days.

(21) Appl. No.: 11/217,114

(22) Filed: Aug. 31, 2005

(65) Prior Publication Data

US 2006/0101314 A1    May 11, 2006

Related U.S. Application Data

(60) Provisional application No. 60/623,682, filed on Oct. 29, 2004.

(51) Int. Cl.
G06F 9/44 (2006.01)
G06F 15/76 (2006.01)
G06F 7/38 (2006.01)

(52) U.S. Cl. ............... 717/119; 712/20; 712/25; 708/507

(58) Field of Classification Search ........... 717/119; 709/213; 707/206; 712/20, 25; 708/507
See application file for complete search history.

(56) References Cited

U.S. PATENT DOCUMENTS

| | | | | |
|---|---|---|---|---|
| 4,982,340 A | * | 1/1991 | Oyanagi et al. | 706/55 |
| 5,341,483 A | * | 8/1994 | Frank et al. | 711/206 |
| 5,355,508 A | * | 10/1994 | Kan | 712/20 |
| 5,535,390 A | * | 7/1996 | Hildebrandt | 711/154 |
| 5,586,281 A | * | 12/1996 | Miyama et al. | 711/5 |
| 5,872,973 A | * | 2/1999 | Mitchell et al. | 719/332 |
| 5,918,063 A | * | 6/1999 | Miyama et al. | 712/25 |
| 5,943,663 A | * | 8/1999 | Mouradian | 706/45 |
| 6,026,237 A | * | 2/2000 | Berry et al. | 717/130 |

(Continued)

OTHER PUBLICATIONS

Michael Kelly, "Framework automation with IBM Rational Functional Tester: Data-driven", Nov. 8, 2005, pp. 1-14, https://www.ibm.com/developerworks/rational/library/05/1108_kelly/.*

(Continued)

*Primary Examiner*—Wei Y Zhen
*Assistant Examiner*—Chih-Ching Chow
(74) *Attorney, Agent, or Firm*—Wolf, Greenfield & Sacks, P.C.; Steven J. Henry

(57) ABSTRACT

In one embodiment, a process may be performed in parallel on a parallel server by defining a data type that may be used to reference data stored on the parallel server and overloading a previously-defined operation, such that when the overloaded operation is called, a command is sent to the parallel server to manipulate the data stored on the parallel server. In some embodiments, the previously-defined operation that is overloaded may be an operation of an operating system. Further, in some embodiments, when the data stored on the parallel server is no longer needed, a command may be sent to the parallel server to reallocate the memory used to store the data.

123 Claims, 7 Drawing Sheets

U.S. PATENT DOCUMENTS

| | | | | |
|---|---|---|---|---|
| 6,106,575 A | * | 8/2000 | Hardwick | 717/119 |
| 6,259,776 B1 | * | 7/2001 | Hunt | 379/114.01 |
| 6,275,916 B1 | * | 8/2001 | Weldon et al. | 711/170 |
| 6,324,495 B1 | * | 11/2001 | Steinman | 703/17 |
| 6,421,690 B1 | * | 7/2002 | Kirk, III | 707/206 |
| 6,711,606 B1 | * | 3/2004 | Leymann et al. | 709/203 |
| 6,779,188 B1 | * | 8/2004 | Blandy et al. | 719/331 |
| 7,093,231 B2 | * | 8/2006 | Nuss | 717/114 |
| 2005/0097514 A1 | * | 5/2005 | Nuss | 717/114 |

OTHER PUBLICATIONS

International Search Report from International Patent Application No. PCT/US2005/039041.

Anonymous: "LCR 2004—Technical Program" Seventh Workshop on Languages, Compilers and Run-Time Systems For Scalable Computers (LCR 2004) Web Site, [Online] Oct. 27, 2004, XP002375720.

Fraguela B. et al.: "The Hierarchically Tiled Arrays Programming Approach" Paper Presented At The Seventh Workshop on Languages, Compilers and Run-Time Systems For Scalable Computers (LCR 2004) Oct. 21-23, 2004—Houston, Texas, USA [Online] Oct. 27, 2004, XP002375714.

Choy R., Edelman, A.: "Solving Multiple Classes of Problems in Parallel With MATLAB*P" Singapore-MIT Alliances (SMA)—Computer Science (CS) Collection, Jan. 2004, XP00237393.

Dongarra J.:"Jack Dongarra—Papers" Internet Page, [Online] Feb. 29, 2004, XP002375782.

Luszczek P., Dongarra J.: "Design of Interactive Environment for Numerically Intensive Parallel Linear Algebra Calculcations" Paper to be Presented at the International Conference on Computational Science 2004 (ICCS 2004) Jun. 6-9, 2004 Krakow Poland, [Online] Feb. 29, 2004, XP002375715.

Husbands P., Isbell C., Edelman, A.: "International Supercomputing with MIT Matlab" DSPACE at MIT—Computer Science and Artificial Intelligence Lab (CSAIL) Artificial Intelligence Lab Publications—AI MEMOS (1959-2004), [Online] no. AIM-1642, Jul. 28, 1998 XP002375716.

Menon Y. et al.: "MultiMATLAB: integrating MATLAB with high-performance parallel computing" Proceedings of the 1997 ACM/IEEE SC97 Conference ACM New York, NY, USA, 1997, p. 18 pp., XP002373292 ISBN: 0-89791-985-8.

Husbands P., et al.: "The parallel problems server: a client-server model for interactive large scale scientific computation" Vector and Parallel Processing—Vecpar '98. Third International Conference. Selected Papers and Invited Talks Springer-Verlag Berlin, Germany, 1999, pp. 156-169, XP002373294 ISBN: 3-540-66228-6.

* cited by examiner

METHODS AND APPARATUS FOR PARALLEL EXECUTION OF A PROCESS

CROSS REFERENCE TO RELATED APPLICATIONS

This application claims the benefit under 35 U.S.C. §119(e) of co-pending U.S. Provisional Application Ser. No. 60/623,682, filed Oct. 29, 2004, entitled "A Method And System For An Interactive Parallel Programming Environment" by Long Yin Choy, et. al., the contents of which are incorporated herein by reference.

This invention was made with Government support under Contract Nos. F19628-00-C-0002 and F30602-02-1-0181 awarded by the U.S. Air Force, under Contract Nos. CCR9404326 and DMS9971591 awarded by the NSF, and under Contract Nos. DE-FG02-04ER25631 and DE-FG02-04ER25632 awarded by DOE. The Government has certain rights in this invention.

FIELD OF THE INVENTION

The present invention relates to providing parallel processing capability.

DESCRIPTION OF THE RELATED ART

Parallel computing is the concurrent use of multiple processors to solve a computational problem. Large problems may take significant time to solve using only a single processor. Thus, such problems may be divided among multiple processors, each of which solves a portion of the problem. However, writing program code to solve a computational problem in parallel may present challenges. For example, a programmer may have to devise a complex algorithm to determine an efficient way in which to divide the problem up among the multiple processors, how memory should be allocated and shared among these processors, and how messages should be passed between processors.

The programmer may also wish to employ pre-existing parallel computing software packages, such as, for example, parallel virtual machine (PVM) or message passing interface (MPI) packages, so that routines for sharing data between processors, spawning additional processes, and other general parallel computing tasks need not be coded from scratch. Thus, the programmer may have to be familiar with such software packages.

SUMMARY

One aspect of the invention is directed to a method of enabling performance of a process in parallel. The method comprises acts of: (a) defining a data type capable of referencing data stored on a parallel server; (b) defining an overloaded operation that overloads a previously-defined operation, wherein the overloaded operation is defined to operate on an instance of the data type and to cause a process to be performed in parallel on data stored in memory on the parallel server that is referenced by the instance of the data type, and wherein the previously-defined operation is defined to cause the process to be performed serially; and (c) defining a routine that, when the data stored on the parallel server is no longer needed, causes at least a portion of the memory on the parallel server that stores such data to be reallocated. Another aspect is directed to at least one computer readable medium encoded with instructions that, when executed on a computer system, perform the above-described method.

A further aspect is directed to a computer in a computer system comprising the computer, a parallel server, and a communication link that couples the computer and the parallel server. The computer comprises: an input; and at least one controller coupled to the output that: (a) receives, via the input, a definition of a data type capable of referencing data stored on the parallel server; (b) receives, via the input, a definition of an overloaded operation that overloads a previously-defined operation, wherein the overloaded operation is defined to operate on an instance of the data type and to cause a process to be performed in parallel on data stored in memory on the parallel server that is referenced by the instance of the data type, and wherein the previously-defined operation is defined to cause the process to be performed serially; and (c) receives, via the input, a definition of a routine that, when the data stored on the parallel server is no longer needed, causes at least a portion of the memory on the parallel server that stores the data to be reallocated.

Another aspect is directed to a method of performing a process in parallel on a parallel computer. The method comprises acts of: (a) receiving, at the parallel computer, a first command to perform the process, wherein generation of the first command is caused by performance of an overloaded operation, in a programming language, wherein the overloaded operation overloads a previously-defined operation, and wherein the previously-defined operation is defined to cause the process to be performed serially; (b) performing the process in parallel on the parallel computer to generate a result; (c) storing the result in memory on the parallel computer; and (d) receiving, at the parallel computer, a second command to reallocate the memory on the parallel computer that stores the result. A further embodiment is directed to at least one computer readable medium encoded with instructions that, when executed on a computer system, perform the above-described method.

Another aspect is directed to a parallel computer comprising: an input; and at least one controller, coupled to the input, that: (a) receives, via the input, a first command to perform a process, wherein generation of the first command is caused by performance of an overloaded operation, in a programming language, wherein the overloaded operation overloads a previously-defined operation, and wherein the previously-defined operation is defined to cause the process to be performed serially; (b) performs the process in parallel to generate a result; stores the result in memory on the parallel computer; and (c) receives, via the input, a second command to reallocate the memory on the parallel computer that stores the result.

A further aspect is directed to a method of enabling performance of a process in parallel on a parallel server. The method comprises an act of defining an overloaded operation that overloads a previously-defined operation of an operating system, wherein the overloaded operation is defined to cause a process to be performed in parallel on data stored in memory on the parallel server, and wherein the previously-defined operation is defined to cause the process to be performed serially. Another aspect is directed to at least one computer readable medium encoded with instructions that, when executed on a computer system, perform the above-described method.

A further aspect is directed to a computer in a computer system comprising the computer, a parallel server, and a communication link coupling the computer and the parallel server. The computer comprises: an input; and at least one controller, coupled to the input, that: receives a definition of an overloaded operation that overloads a previously-defined operation of an operating system, wherein the overloaded operation is defined to cause a process to be performed in parallel on data stored in memory on the parallel server, and wherein the previously-defined operation is defined to cause the process to be performed serially.

The foregoing aspects may be implemented and practiced alone or in any non-conflicting combination.

DETAILED DESCRIPTION

Figure 1:
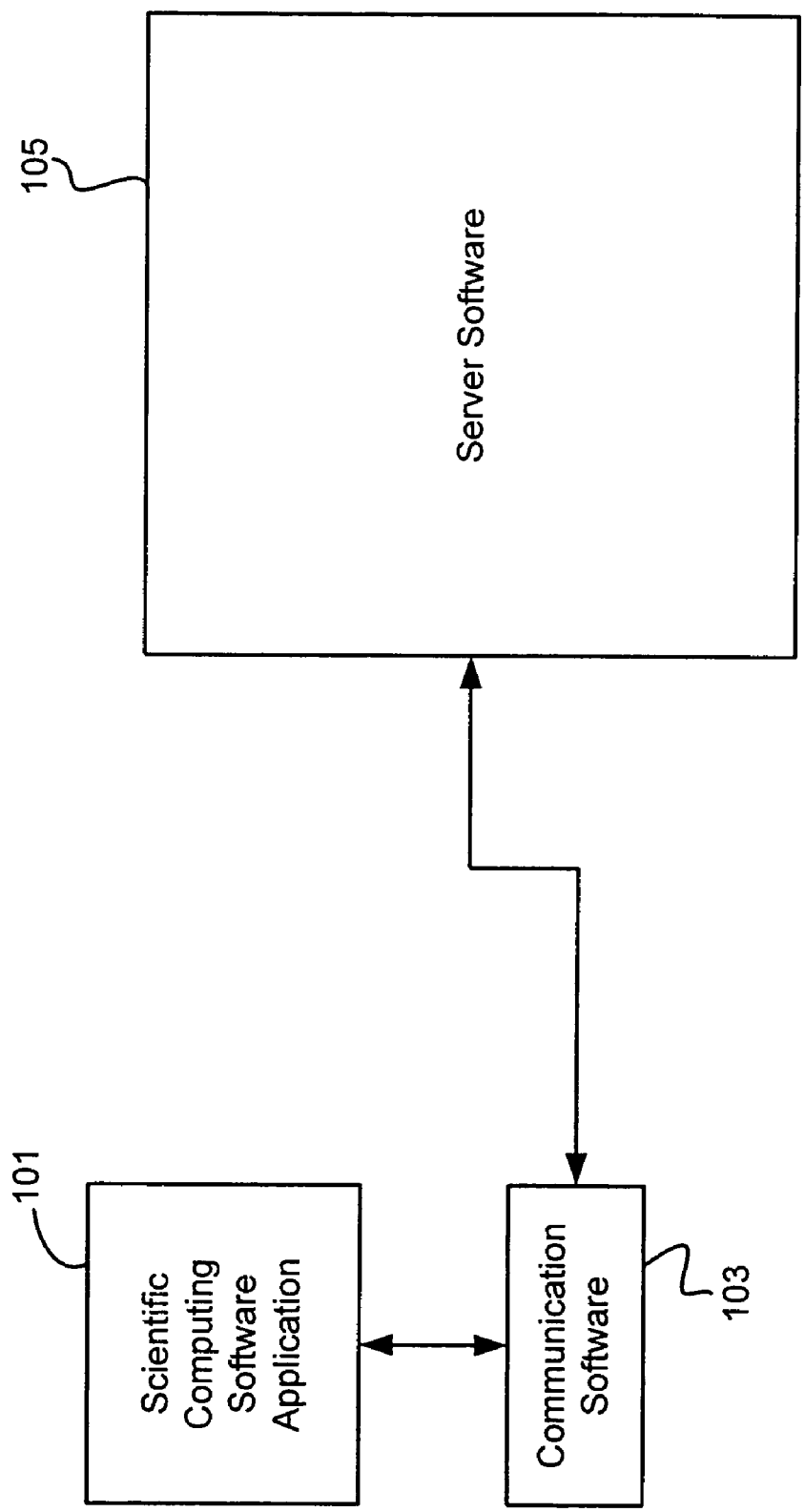
FIG. 1 is a block diagram of a system adaptable to perform a process of a scientific computing software application in parallel, in accordance with some embodiments for practicing the teachings herein.

Scientific computing software applications are widely used in the science and engineering community as computing and modeling tools. As used herein, the term scientific computing software application refers to a software application capable of solving computational problems that are input by a user. Examples of commercially available scientific computing software applications include MATLAB™, produced and sold by The MathWorks, Natick, Mass., Maple™, produced and sold by Maplesoft, Waterloo, Ontario, Canada, and Mathematica™, produced and sold by Wolfram Research, Champaign, Ill. These software applications are useful in a variety of disciplines, including, for example, engineering, mathematics, physics, life sciences, chemistry, chemical engineering, social sciences, finance, economics, and others. It should be appreciated that while referred to as a scientific computing software application, scientific software applications are not limited to solving problems or performing calculations of a scientific nature, as any suitable type of problems or calculations may be processed by the scientific computing software application.

Because of the breadth of the fields in which these applications are used, their users are often not professional software developers, but rather may have little programming experience and skill. Thus, the creators of such software applications usually provide a high-level programming language and a user-friendly interface that allows users with little programming experience to employ the software application to perform computational and modeling tasks. Such scientific computing software applications typically include a significant amount of built-in intelligence, which often results in less code being written to solve a problem than to solve the same problem in a traditional programming language such as, for example, C, C++, or FORTRAN. Further, the syntax of a scientific computing software application programming language is typically far less strict than a traditional programming language and low-level tasks such as memory allocation and management are typically handled by the application and are out of the control of the programmer. These scientific computing software application programming languages take control away from the programmer and additional parsing and interpreting performed by these applications may require additional processor cycles and may result in less efficient execution of a program, making them unsuitable for some applications. However, the time and level of skill required to write effective programs are often reduced, making these applications usable by less-experienced and less-skilled programmers; and even skilled programmers may save a lot of time.

For example, the programming language of a scientific computing software application may have a built-in data-type for matrices and built-in matrix operations, such that when a mathematical operator (e.g., plus) is used with operators that are of the matrix data type, a matrix operation is automatically performed. An example of a program for adding two 2×2 matrices represented by the variables A and B in a scientific computing software application is shown in Table 1.

TABLE 1

C = A + B

By contrast, performing the same matrix addition in a traditional programming language such as C may require more code and may involve operating on each individual matrix element. An example of a program for performing the same task in the C programming language is shown in Table 2.

TABLE 2

C[0][0] = A[0][0] + B[0][0];
C[0][1] = A[0][1] + B[0][1];
C[1][0] = A[1][0] + B[1][0];
C[1][1] = A[1][1] + B[1][1];

As can be seen from the above example, even a simple task, such as adding two very small matrices, many more lines of code in C (in the example, four times the number of lines) than it does in the programming language of a typical scientific computing software application.

While these scientific computing programming languages are well-suited for allowing inexperienced programmers to solve computational problems relatively easily, their usefulness is limited in solving very large or very complex problems. That is, large and/or complex problems may take a significant and/or unacceptable amount of time to solve using a single processor and it may be desirable instead to solve the problem in parallel (e.g., by dividing the problem up amongst multiple processors). However, some scientific computing software applications do not include built-in parallel computing capability. Others that do provide parallel computing capability or are capable of operating in conjunction with third-party add-on software packages that provide parallel computing capability, may be limited in their capabilities and may require the programmer to have detailed knowledge of parallel processing techniques, such as devising and coding a complex parallel algorithm, controlling memory allocation and management, and/or managing interprocessor communication. Thus, the parallel computing capabilities available in connection with a scientific computing software application may be insufficient to perform the desired task and/or may be too complex for the level of skill of the typical user of the software application.

Thus, Applicants have appreciated that it may be desirable to provide parallel computing capability in a scientific computing application that is easy to use, does not differ much, from the user's perspective, from the serial (i.e., non-parallel) use of the scientific computing application, and does not require a lot of learning on the users' part. The embodiments described below may provide some, all, or none of the benefits listed above and it should be appreciated that the invention is not limited to providing all or any of these benefits.

In one embodiment, a technique referred to herein as "parallelism through polymorphism" may be employed to provide a parallel computing capability. Parallelism through polymorphism allows a programmer to use the same (or what he perceives to be the same) operators and method calls that he is familiar with, but causes the operations performed by these operators and method calls to be performed in parallel.

In object-oriented programming (OOP) terminology, polymorphism refers to a characteristic of a programming language whereby operators and methods have different functionalities depending on the data types of their parameters. Many programming languages allow users to create new data types, sometimes referred to as classes, that have specific properties. For example, a programmer may define a data type or class called Triangle that has properties defining a triangle, such as the length of each side, the measure of each angle, and the height.

A technique referred to as overloading may be employed when implementing polymorphism. As used herein, the term overloading refers to having two or more objects or methods that have the same name but have different meanings or functionalities depending on the context in which the object or method is used.

For example, which method is called may depend on the number of parameters with which the method is called or the data type of parameters with which the method is called. That is, a programmer may define two methods each named Area. The first Area method may take as a parameter a user-defined data type called Triangle and computes the area of a triangle. The second Area method may take as a parameter a user-defined data type called Circle and computes the area of a circle. Thus, simply from the line of code "B=Area(A)," it cannot be determined which Area method is to be called. That is, if the variable A is of the data type Triangle, the first Area method is called, while if the variable A is of the data type Circle, the second Area method is called.

As another example, from the programmer's perspective, the method call for the two or more methods that share the same name may be identical. That is, the method name, the number of parameters and the type of parameters are the same for both (or all) of the methods and the decision as to which of the two or methods is called is not made by the programmer at the time of programming. For example, the line of code x+y, where both x and y are variables that represent matrices of integers may have different functionality depending on the context in which the line of code is written. Thus, for example, if both x and y are small matrices, an addition routine that performs a normal matrix addition may be called. However, if either x or y represents a matrix larger than a certain size an addition routine that performs the matrix addition in parallel may be called. The decision as to which addition routine is to be called may be made in any suitable way as the invention is not limited in this respect. For example, the decision may be made either at compile time, at run time, or at any other suitable time. Further, the decision may be made by any suitable entity, such as the compiler or interpreter of the programming language, or an outside software program (though the compiler, interpreter, or outside software program may be manually configured, e.g., by a programmer, to make these decisions in a certain way).

As in the example above, operators may also be overloaded. For example, the function of the '+' operator in the line of code 'C=A+B' may be different depending on the data types of the operands A and B. That is, if the operands A and B are integers, the '+' operator may be defined to perform a integer addition. However, if the operands A and B are arrays or matrices, the '+' operator may be defined, by the programmer, to perform a matrix addition.

FIG. 1 is an example of a system in which polymorphism (e.g., by overloading methods and/or operators) may be used to provide parallel computing capability to a scientific computing software application. The system of FIG. 1 includes a scientific computing software application 101, communication software 103, and server software 105.

In one embodiment, operators and/or methods of a program of scientific computing software application 101 may be overloaded. The overloaded methods and/or operators may be defined to pass a message to communication software 103 requesting that a certain operation or process be performed in parallel. Communication software 103, in response to receiving the message, may then send a command to server software 105 to perform the process in parallel. This may be done in any suitable way, as the invention is not limited in this respect. For example, a new data type or class may be defined and operators and/or methods may be overloaded such that when the operators and/or methods are called with a parameter or operand of the newly defined data type, the overloaded method is called.

As an example, the rand function in the programming language of a scientific computing software application may be a built-in method of scientific computing software application 101 that creates an n-by-n matrix of randomly-valued entries, where n is an integer value specified in the parameter of the method. Thus, the line of code in Table 3 creates a 100-by-100 matrix of random numbers and stores the result in the variable 'X.' The server software may then pass out tasks to a plurality of processors, to complete the task or tasks require by the method.

TABLE 3

X = rand(100);

However, the rand method may be overloaded so that if the parameter provided is of the new data type (i.e., as opposed to an integer or scalar), then the overloaded rand method is called rather than the built-in rand method. For example, in the line of code in Table 4, the parameter provided to the rand method is "100*p." The variable p may be an object of the new data type or class which, for the purposes of this example is called the dlayout class. The * operator may be the built-in multiplication operator of scientific computing software application 101, which takes two operands. However, the * operator may be overloaded, such that when one or both of its operands are objects of the dlayout class, the overloaded operator is called. The overloaded * operator may return an object of the dlayout class.

TABLE 4

X = rand(100*p);

Thus, the operation "100*p" in Table 4 may return a dlayout object. The rand method may also be overloaded so that when the parameter provided is a dlayout object (instead of an integer or scalar), the overloaded rand method is called. The overloaded rand method may call communication software 103 which sends a command to server software 105 to create a distributed 100-by-100 matrix. The overloaded rand method may return an object of a user-defined data type or class that may be used as a name or handle to reference the matrix created on the parallel server. For example, the overloaded rand method may return an object of the user-defined ddense class, which is stored in the variable X. Thus, the distributed matrix on the parallel server may be accessed and manipulated using the variable X. For example, as shown in Table 5, a method for computing the eigenvalues of a matrix may be performed on the distributed matrix.

That is, the built-in method eig of scientific computing software application 101 may take a matrix or an array as its parameter. However, the eig function may be overloaded so that if the parameter provided to the method is an object of the ddense class, the overloaded method is called. Like the overloaded rand method, the overloaded eig method, when called, may call communication software 103 which may send a command to server software 105 to calculate the eigenvalues of the distributed matrix X. The overloaded eig method may also return an object of the ddense class, which is stored in the variable Y, and may be used as a handle to access the matrix of eigenvalues on the parallel server.

TABLE 5

Y = eig(X)

Because the overloaded methods and/or operators used to contact the parallel server as well as the parallel algorithms that execute on the parallel server may be provided for the user of the scientific computing software application (i.e., without the user having to code them), the user need not have detailed knowledge of parallel programming. Rather, much of the parallel processing capability is transparent to the user.

For example, continuing with the examples provided above, from the user's perspective, the only difference in the program code needed to create a 100-by-100 matrix of random numbers and compute its eigenvalues is the addition of the tag "*p" in the parameter of the rand method, as shown above in Table 4. However, the "*p" tag causes a distributed matrix to be created on the parallel server and future operations on the matrix to be performed in parallel, without the user having to devise or code an parallel algorithms. In the examples above, the rand and eig methods and the * operator were overloaded to perform certain operations in parallel, such as creating a distributed matrix on a parallel server and computing its eigenvalues in parallel. However, the invention is not limited in this respect, as any suitable built-in method or operator of the scientific computing software application may be overloaded (e.g., to cause its functionality to be performed in parallel).

It should be appreciated that, although in the examples above certain data types, classes, methods, and/or operators are described as being user-defined, these data-types, classes, methods, and/or operators need not be defined by the ultimate end user of the scientific computing software application. Indeed, the term user-defined is merely used to distinguish between those classes, methods, and operators that are built-in to the scientific computing software application programming language by its publisher's specification and those that are added in by an external programmer. Thus, in one embodiment, the overloaded methods, operators, and user-defined classes may be provided in a software package that also includes communication software 103 and server software 105. The software package, when installed, may work in conjunction with scientific computing software application 101 to provide the above-described parallel processing functionality.

Further, in the examples above, the built-in methods and operators were only overloaded with a single additional method or operator. However, the invention is not limited in this respect, as a method or operator may be overloaded with any suitable number of methods or operators. That is, in the example provided above, the * operator was overloaded with a * operator that takes an object of the dlayout class as one of its operands and returns a dlayout object. However, the * operator could also be overloaded with an operator that takes two ddense objects (each of which references a distributed matrix on the parallel server) as its operands, causes a matrix multiplication of the two distributed matrices to be performed in parallel, and returns a ddense object that serves as reference to the distributed matrix that results from the matrix multiplication. Thus, in the example above, the * operator may perform one of three different operations, depending on the data types of its operands.

Additionally, in the examples above, two data types or classes were defined (i.e., dlayout and ddense). It should be appreciated that these class names are provided as examples and any suitable class names or data type names may be used. Moreover, while in the examples above two user-defined data types or classes were used in connection with providing parallel computing capability in scientific computing software application 101, the invention is not limited in this respect, as any suitable number of user-defined data types or classes may be used. Further, any suitable data and methods may be encapsulated in these user defined data types, as the invention is not limited in this respect.

In one embodiment, scientific computing software application 101 and communication software 103 may execute on the processor of a client computer, while server software 105 may execute on multiple processors of one or more parallel servers. However, the invention is not limited in this respect, as scientific software application 101 and communication software 103 may execute on any suitable processor or processors. For example, scientific software application 101 may execute on one of the processors of the parallel server that executes server software 105. In such embodiments, the processor that executes scientific software application 101 and/or communication software 103 may be viewed as the client, while the remaining processors in parallel server 105 (individually and in collections of one or more of them) may be viewed as the parallel server. It should be appreciated that the processor that executes scientific software application 101 and/or communication software 103 may also execute a portion of server software 105. Thus, this processor may be viewed as the client as well as part of the parallel server.

The parallel server that executes server software 105 may be any suitable type of parallel server, as the invention is not limited in this respect. For example, the parallel server may be a symmetric multiprocessing (SMP) system, a massively parallel processor (MPP) system, or may be a Beowulf cluster. In this respect, it should be appreciated that parallel server may include a plurality of separate machines that are linked together so that they may operate on a single problem in parallel. A system having such an architecture may be viewed as a single parallel server, despite being made up of many individual computers that are also capable of operating independently of each other.

In the examples above, overloaded methods and operators are used in scientific computing software application 101 to call and/or pass messages to communication software 103 (which, in turn, sends a command to parallel server 105). These software entities may communicate in any suitable way, as the invention is not limited in this respect. For example, in one embodiment, subroutines of communication software 103 may be linked (either statically or dynamically) into scientific computing software application 101, so that the overloaded methods and/or operators of scientific computing software application may directly call these subroutines. In another embodiment, interprocess communication may be used to communicate between scientific computing software application 101 and communication software 103. Any suitable form of interprocess communication may be used, such as, for example, pipes, signals, message queues, semaphores, shared memory, sockets, or any other suitable form, as the invention is not limited in this respect.

Because scientific computing software applications are intended primarily for computing and modeling, the programming languages of these software applications typically do not provide the capability to perform and/or handle communications over a network. Thus, in one embodiment, communication software 103 may be written in a language (e.g., C or Fortran) that provides network communication capability. However, in embodiments of the invention in which the programming language of scientific computing software application 101 allows a programmer to perform network communications, communication software 103 need not be used, and the overloaded methods and operators of scientific computing software application 101 may programmed to send commands to server software 105 (i.e., without using communication software 103 as an intermediary).

In embodiments wherein scientific computing software application 101 and communication software 103 reside on a separate machine from server software 105, communication software 103 or (in embodiments where communication software 103 is not used) scientific computing software application 101 may communicate with server software 105 over a network. Any suitable network protocol or protocols may be used, as the invention is not limited in this respect. For example, in some embodiments, the TCP/IP protocol may be used. In embodiments wherein scientific computing software application 101 and communication software reside on a processor of the parallel server that executes server software 105, any suitable method of communication between communication software 103 (or, in some embodiments, scientific computing software application 101) and parallel server 105 may be used. For example, network based communication may be used, even though the communications are not necessarily traveling over a network; interprocess communication may be used; or any other suitable form of communication may be used, as the invention is not limited in this respect.

Applicants have appreciated that solving problems in parallel often involves operating on very large data sets. Consequently, passing results between the client and the parallel server each time they are computed may decrease performance. Thus, in one embodiment, data may remain on the parallel server, unless results are explicitly requested to be sent to the client. For example, as discussed in above, the example line of code in Table 4 causes a command to be sent to the parallel server to create a 100-by-100 matrix distributed matrix of random numbers. The parallel server may create the 100-by-100 matrix in response to the command. If the result of this computation (i.e., the 100-by-100 matrix) were to be sent back to the client rather than keeping the data on the parallel server, 10,000 numbers may have to be sent back to the client. Further, future operations on the matrix to be performed by the parallel server may involve sending the matrix data back to the parallel server from the client so that the parallel server may operate on the data. This sequence may increase network traffic, latency, and overall processing time.

However, if the data remains on the parallel server, the data need not be transferred unless the user of the scientific computing software application explicitly requests to view the data. For example, the 100-by-100 matrix created on the parallel server using the line of code in Table 4 may remain on the parallel server and only a reference to that data may be returned to the scientific computing software application. In the example, in Table 4, this reference is stored in the ddense variable 'X.' Thus, if it is desired to perform future operations on the matrix, the matrix data can be identified and located on the parallel server using this reference.

If a user of a scientific software computing application desires to view a portion of the resulting data, the user may request that this data be returned from the parallel server and displayed. This may be done in any suitable way, as the invention is not limited in this respect. In some embodiments, method and/or operator overloading may be used to request that data stored on the parallel server be returned to the client. For example, the line of code shown in Table 6 may be used to retrieve and display the first element of the distributed matrix created by the line of code in Table 4. Scientific computing software application 101 may provide, for example, a method called subsref that is used to access an array or matrix element and invoked by the notation A(R,C), where A is a variable that represents the array or matrix and R,C refers to the row and column of the requested matrix element. The subsref function may be overloaded so that if called with a ddense variable as its parameter instead of an array or matrix, a command may be sent to the parallel server to return the requested element of the matrix that is referenced by the ddense variable.

TABLE 6

X(1,1)

Figure 2:
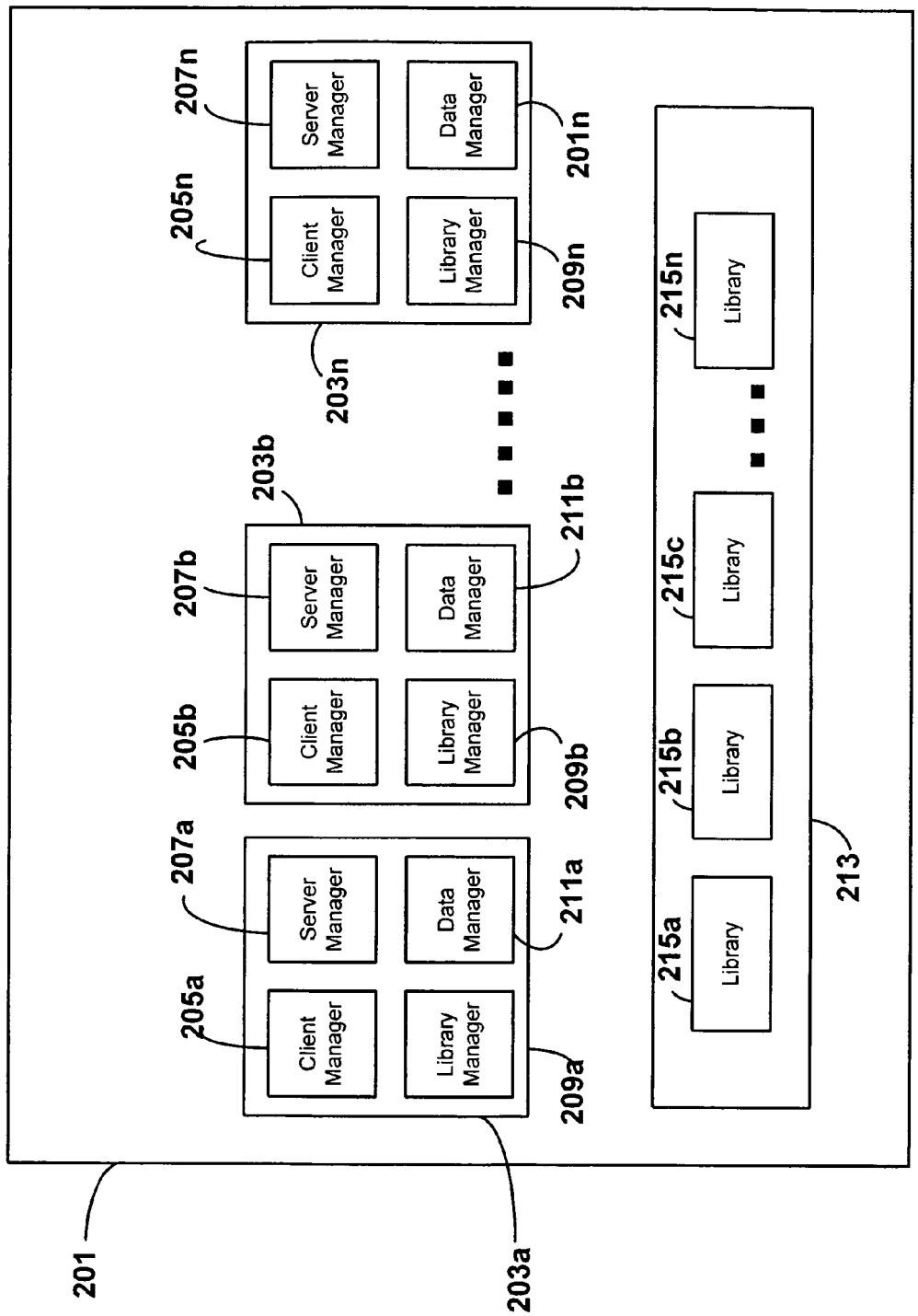
FIG. 2 is a block diagram of an example of parallel server that executes the server software of FIG. 1, in accordance with the methods any systems as taught herein.

Server software 105 may operate in any suitable way to receive commands from the client and perform operations in parallel, as the invention is not limited in this respect. FIG. 2 is but one example of a suitable configuration of server software 105 for at least some embodiments. In FIG. 2, parallel server 201 includes a plurality of processors, 203a, 203b, ..., 203n, and a memory 213. Each of processors 203a-203n includes four software modules: client managers 205a, 205b, ..., 205n; server managers 207a, 207b, ..., 207n; library managers 209a, 209b, ..., 209n; and data managers 211a, 211b, ..., 211n. Memory 213 of parallel server 201 stores a plurality of software libraries 215a, 215b, 215c, ..., 215n that include routines for performing various operations.

Client managers 205 interface with clients, and provides routines for reading commands and arguments from a client and sending results and other data back to the client. Server managers 207 handle communications between server processes executing on different processors of parallel server 201. That is, server managers 207 manage the transmission of data between the processors of parallel server 201 and collect results and error codes from the processors. Library managers 209 are responsible for maintaining a list of available software libraries 215 and the routines provided by them. When instructed by a server manager 207, library manager may perform a call to a routine of one of the libraries 215. Data managers 211 include routines for creating, deleting, and changing, data stored on the parallel server. Data managers 211 maintain a mapping between the references and/or identifiers used by the client to identify the data and the actual storage location of the data.

In one embodiment, when server software 105 is initialized, one processor may be designated the head processor and all or some of the remaining processors may be designated slave processors that operate under the control of the head processor. The head processor may serve as the central processor and may receive the commands from the client. Thus, in one embodiment, only the client manager module 205 on the head processor is used. When the head processor receives a command from the client, the server manager 207 on the head processor may send messages to the "slave" processors to perform the desired operation. The library managers 209 on each of the processors may call the appropriate routine in libraries 215.

The server managers 207 on the processors 203 may communicate with each other in any suitable way, as the invention is not limited in this respect. In one embodiment, the message passage interface (MPI) application programming interface (API) may be used. Alternatively, the parallel virtual machine (PVM) API or any other suitable from of communication may be used.

In the example of FIG. 2, parallel server 201 is shown having a memory 213 which stores software libraries 215. Memory 213 may be assembled from any suitable type of memory or memories and may include, for example, non-volatile storage media, such as magnetic disk, optical disc, or tape, and/or volatile memory, such as random access memory (RAM). Further, in FIG. 2, parallel server 201 is shown having a single memory that is shared by all processors. However, the invention is not limited in this respect, as each processor may have a separate memory or clusters of processors may share memory. For example, in embodiments in which parallel server 201 is implemented as a Beowulf cluster, each processor may have a separate memory and a separate copy of libraries 215 (or parts thereof). Further, in some embodiments in which processors 203 share a memory, portions of the memory may be allocated to each processor for exclusive use by that processor. Thus, each processor may maintain a separate copy of libraries 215 in the portion of the memory allocated to it.

In the example of FIG. 2, parallel server 201 includes processors 203a-203n. It should be appreciated that the parallel server may have any suitable number of processors and the invention is not limited in this respect. Similarly, memory 213 may store any suitable number of software libraries. Examples of software libraries that may be used are ScaLAPACK and the Parallel Basic Linear Algebra Subprograms (PBLAS) library, both of which include parallel linear algebra routines.

In the example of FIG. 2, server software 105 is implemented, in part, as four software modules on each processor. It should be appreciated that the invention is not limited in this respect, as server software 105 may be implemented in any suitable way.

Further, it should be understood that the four modules in the above-described examples are intended to illustrate functionally how server software 105 may operate. However, the four modules need not be implemented as separate computer programs and may be implemented in any suitable way, as the invention is not limited in this respect.

During execution of a program in which the above-described parallel computing capabilities are used, memory may be dynamically allocated on both the client and the parallel server. As is well known, this may result, particularly in an object-oriented programming language, in memory being allocated to objects and processors no longer in use. Thus, "garbage collection" techniques may be used on both the client and the parallel server to free up such memory that has been dynamically allocated. Some programming languages provide automatic garbage collection, some provide for manual garbage collection, and some provide no garbage collection at all. In a programming language that provides an automatic garbage collector, the programmer may define a destructor method in a class definition. When an object of the class is instantiated, memory is dynamically allocated to store the object. The garbage collector automatically determines when the object is no longer needed (i.e., goes out of scope) and calls the object's destructor method. An example of a programming language that provides automatic garbage collection is the JAVA™ programming language. In programming languages that provide for manual garbage collection, a destructor method may be called explicitly by the programmer (i.e., in the program). An example of a programming language that provides for manual garbage collection is the C++ programming language.

Figure 3:
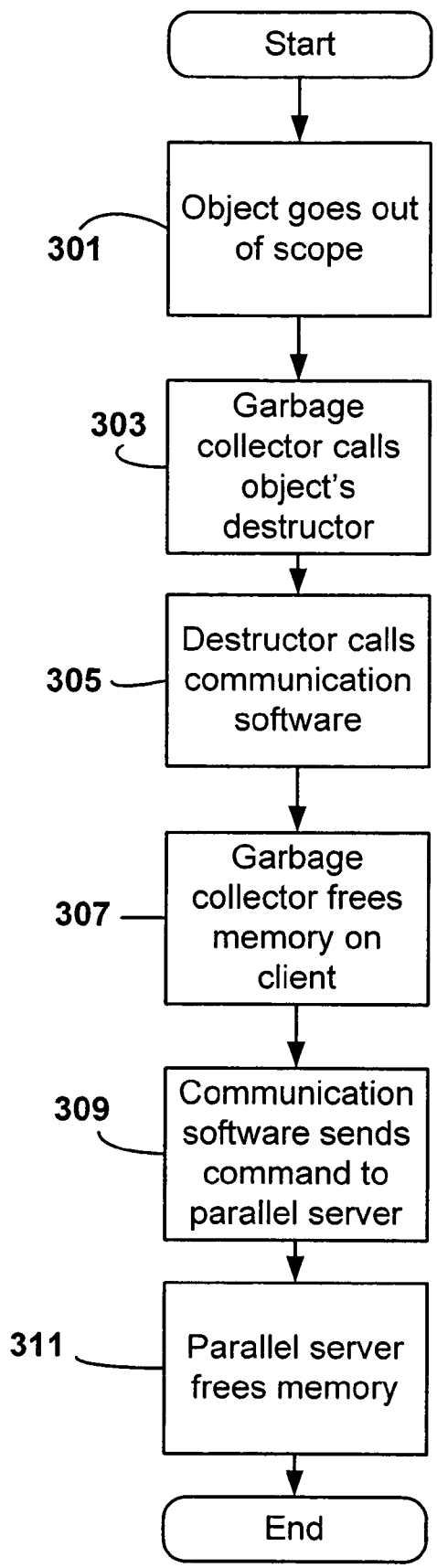
FIG. 3 is a flow chart illustrating an example of a process for performing garbage collection, in accordance with the methods any systems as taught herein.

In some embodiments of the invention, the programming language of scientific computing software application 101 may provide automatic garbage collection. However, the automatic garbage collector only frees memory allocated on the client, but does not free memory allocated on the parallel server. For example, the line of code in Table 4 creates a ddense object, X, on the client that serves as reference to a distributed 100-by-100 matrix of random numbers that is created on the parallel server. Thus, it is desired to free the memory used by the object X on the client and to free the memory used by the distributed matrix referenced by the object X on the parallel server. FIG. 3 is a flow chart that shows an example of a process to accomplish these tasks.

In FIG. 3, at act 301, the object X "goes out of scope," as computer scientists say. That is, the object is no longer needed. This condition is ascertained by the garbage collector and, at act 303 the garbage collector may call the object's destructor method. The object's destructor method may be defined (e.g., in the class definition) to call a routine of communication software 103, which sends a command to the server software 105 to free the memory on the parallel server used to store the distributed matrix. Thus, the process continues to act 305, where the object's destructor calls communication software 103. The destructor may pass the reference information stored in the object that identifies the matrix on the parallel server. The process next continues to act 307, where the garbage collector frees the memory on the client used to store the object. At act 309, communication software 103 may send a command to the parallel server to free the memory on parallel server used to store the matrix referenced by the object X. The command may include a reference to the matrix that the parallel server may use to identify the matrix and the memory locations that should be freed. The process then continues to act 311 where, after receiving the request to free the memory, parallel server 311 frees the memory used to store the distributed matrix.

After receiving the command from communication software 103, the parallel server may free the memory in any suitable way as the invention is not limited in this respect. For example, the command from communication software 103 may be received by the head processor of the parallel server. The head processor may then send a message to each slave processor to free the memory used to store the portion of the distributed matrix controlled by the respective slave processor.

In the example of FIG. 3, memory on the client used to store an object that referenced a distributed matrix and memory on the parallel server used to store the distributed matrix were freed. However, it should be appreciated that the garbage collection process described in FIG. 3 is not limited to use with freeing memory that stores objects which reference distributed matrices (i.e., on the client) and/or distributed matrices themselves (i.e., on the parallel server). Indeed, memory that stores any suitable type of data may be freed. The data need not be an object or a matrix, but can be any type of data structure, mathematical construct, or any other type of data, as the invention is not limited in this respect.

In some other embodiments of the invention, the programming language of scientific computing software application 101 does not provide a garbage collector. However, scientific computing software application 101 includes an interpreter or virtual machine of a different programming language that does provide automatic garbage collection. Thus, scientific computing software application 101 allows a programmer not only to create objects and run code in the programming language of scientific computing software application 101, but also to create objects and run code in the additional programming language. An example of a scientific computing software application that includes an interpreter or virtual machine of a different programming language is MATLAB™, from The MathWorks, Natick, Mass. MATLAB™ includes a JAVA™ Virtual Machine (JVM), and allows the programmer, inter alia, to construct and use JAVA™ objects and call JAVA™ objects and methods.

Figure 4:
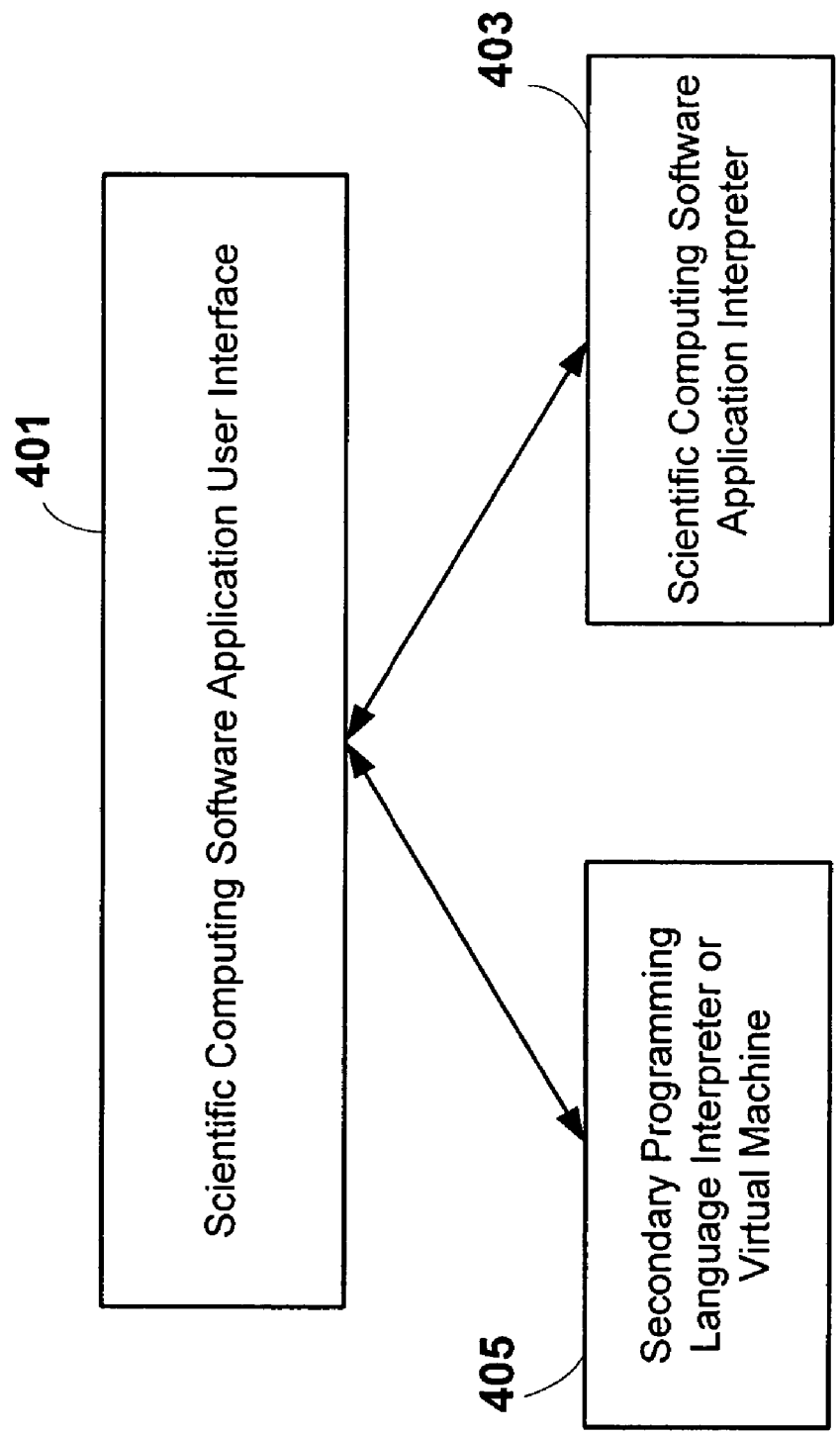
FIG. 4 is a diagram of a scientific computing software application that employs an interpreter or virtual machine of a secondary programming language which may be used in conjunction with embodiments of the methods any systems as taught herein.

Thus, as shown in FIG. 4, code may be input to scientific computing software application by a user through the user interface 401 of the scientific computing software application. The code may be processed either by the interpreter 403 of scientific computing software application 101 or the interpreter or virtual machine 405 of the secondary programming language, based on whether the code is code in the programming language of scientific computing software application 101 or code in the secondary programming language.

In some embodiments, the garbage collector of a secondary programming language virtual machine may be used in freeing, on a parallel server, memory that stores data that is no longer needed. This may be done in any suitable way, as the invention is not limited in this respect. For example, the programming language scientific computing software application does not provide for destructor methods that are automatically called when an object goes out of scope, as this programming language does not provide automatic garbage collection. Thus, in one embodiment, an object of the secondary programming language may be embedded in the object of scientific computing software application programming language.

For example, the ddense class described above may be defined in the scientific computing software application programming language. The class definition may include an object of the secondary programming language. Thus, each time an object of the ddense class is instantiated, an object of the secondary programming language may also be instantiated, and the instantiated object of the ddense class (e.g., that serves as a reference to a distributed matrix on the parallel server) may have a reference to the object of the secondary programming language. Because the secondary programming language provides for automatic garbage collection, the object of secondary programming language may include a destructor method that is called whenever the object goes out of scope. Because the object of the secondary programming language is referenced by the ddense object of the scientific computing software application, the object of the secondary programming language may not go out of scope until the ddense object has gone out of scope. Thus, the garbage collector will not call the destructor of the object of the secondary programming language until after the ddense object has gone out of scope.

In some embodiments, the destructor method of the object of the secondary programming language may include a call to communication software 103, indicating that the memory referenced by the ddense object on the parallel server may be freed. In response to this call, communication software 103 may send a command to server software 105 to free the memory used by the matrix that is referenced by the ddense object. In some embodiments, the destructor method of the object of the secondary programming language may not call communication software 103 to instruct parallel server to free the memory, but rather may add an identifier that identifies the data on the parallel server to be garbage collected to a list of identifiers. A routine of the programming language of scientific computing software application 101 may subsequently pass each identifier in the list to communication software 103, which may, in response, send a command to parallel server 105 to free the memory associated with each identifier.

In some embodiments, the garbage collector of the secondary programming language may be explicitly invoked, in addition to being automatically invoked by the interpreter or virtual machine. For some scientific computing software applications that include an interpreter or virtual machine of a secondary programming language, it may sometimes be unclear when the garbage collector of the secondary programming language is automatically invoked. Thus, determining when and how frequently garbage collection is performed may present challenges. Sometimes, the garbage collector may be invoked explicitly at intervals. This may be done in any suitable way, as the invention is not limited in this respect.

Figure 5:
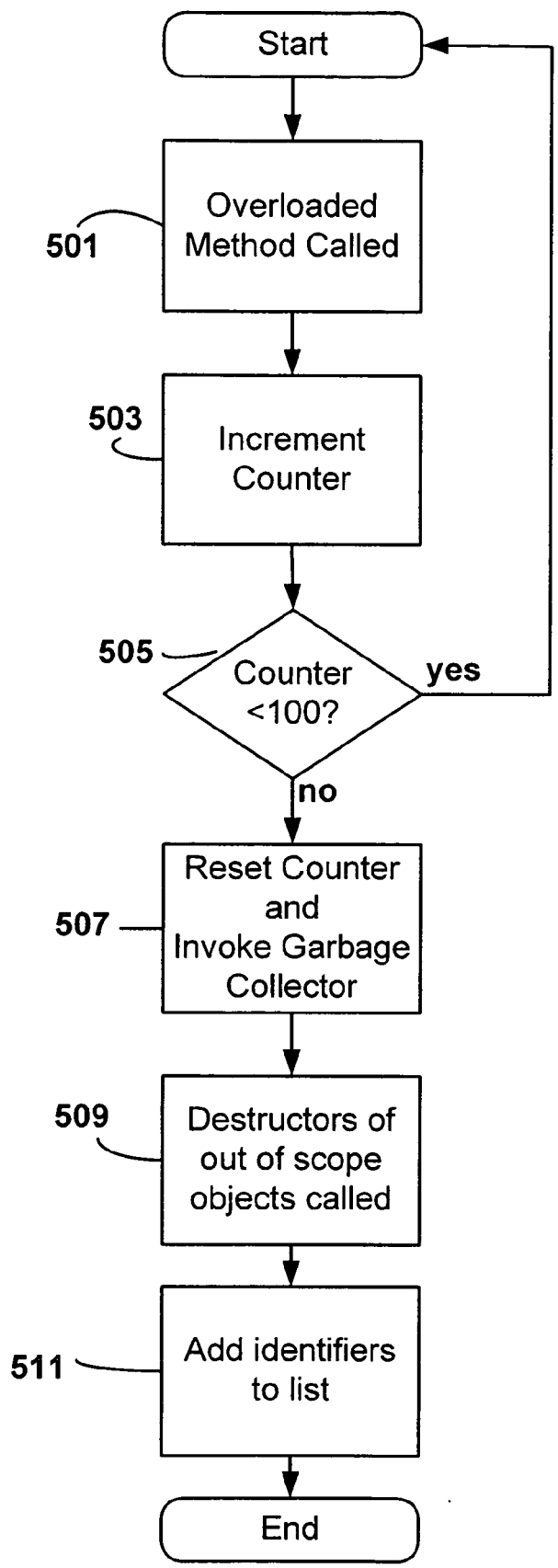
FIG. 5 is a flow chart illustrating an example of a process for performing garbage collection using a scientific computing software application that does not provide destructors.

An example of a process for explicitly invoking the garbage collector at intervals is shown in FIG. 5. In FIG. 5, at act 501, an overloaded method is called. Each time an overloaded method that is used in providing parallelism through polymorphism, as discussed above, is called, a counter may be incremented. This may be done in any suitable way, as the invention is not limited in this respect. For example, the overloaded method may include a call to a method with increments the counter. Thus, the process continues to act 503, where the counter is incremented. The counter may be implemented in any suitable way, as the invention is not limited in this respect. For example, the counter may be implemented as a global variable or in any other suitable way.

The process then continues to act 505, where it is determined whether the counter meets or exceeds a predefined threshold. In the example of FIG. 5, the predefined threshold is 100, however any suitable threshold may be used as the invention is not limited in this respect. If the counter does not meet or exceed the predefined threshold the process returns to the start (i.e., until another overloaded method is called). If the counter does meet or exceed the threshold, the process continues to act 507, where the counter is reset (e.g., to zero) and the garbage collector of the secondary programming language is explicitly invoked. The garbage collector may be explicitly invoked in any suitable way, as the invention is not limited in this respect. In one embodiment, wherein the secondary programming language is the JAVA™ programming language, the line of code in Table 7 may be used to explicitly invoke the garbage collector.

TABLE 7

System.lang.java.gc

When the garbage collector is invoked, processing continues to act 509 where the garbage collector calls the destructor methods of objects of the secondary programming language that have gone out of scope. The process then continues to act 511 wherein each destructor method that has been called adds to a list an identifier that identifies the data on the parallel server to be garbage collected. The list may be implemented in any suitable way, as the invention is not limited in this respect. In one embodiment, the list may be implemented as a data structure in scientific computing software application 101. Alternatively, the list may be implemented as a file that is external to scientific computing software application 101.

As discussed above, a separate routine may subsequently pass each identifier in the list to communication software 103, which may send a command to server software 105 to free the appropriate memory.

In the examples above, when an object is garbage collected, all the memory on the parallel server used to store the object's data is reallocated. As used herein, the term reallocated refers to indicating that memory previously allocated to one or more processes to store data is no longer allocated for that purpose and is available for other use.

Figure 7:
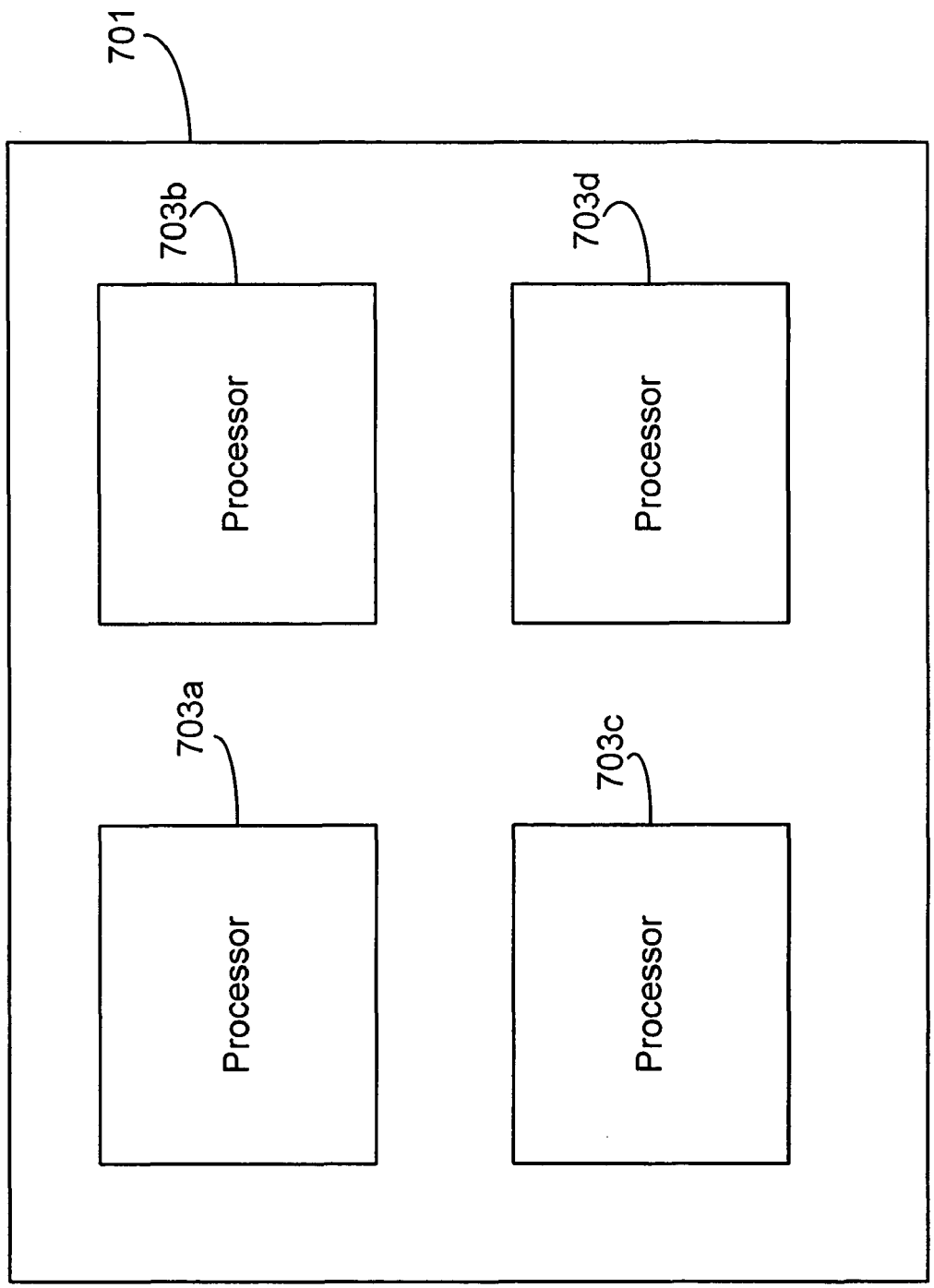
FIG. 7 is a block diagram of a parallel server on which some embodiments of the invention may be implemented.

It should be appreciated that when an object is garbage collected, all of the memory used to store the object and its data need not be reallocated at once, as the invention is not limited in this respect. For example, as shown in FIG. 7, parallel server 701, includes four processors (i.e., processors 703*a*, 703*b*, 703*c*, and 703*d*). Each of the processors 703 may control a portion of the parallel server's memory and an object stored on the parallel server may be distributed such that a portion of the object's data may be stored in each of the processor's memory (though it should be appreciated that object need not be distributed across all of the processors in the parallel server and may be distributed across only a portion of the processors, as the invention is not limited in this respect).

Thus, in one embodiment, when a command is received by the parallel server to garbage collect a particular object and the command is sent to each processor, each processor may individually determine when to reallocate the memory used to store the portion of the object's data under its control. Thus, for example, processor 703*a* may reallocate the memory used to store its portion of the data immediately upon receiving the garbage collection command, while processor 703*b* may reallocate the memory used to store its portion of the data several hours later. Processor 703*b* may reallocate this memory at a later time for any suitable reason, as the invention is not limited in this respect. For example, processor 703*b* may be busy performing another operation and may wait until its processing load has decreased before reallocating the memory. As another example, processor 703*b* may not need to re-use this memory in the near future, as it has plenty of free memory available. Thus, processor 703*b* may wait to free this memory until its amount of free memory has dropped below a particular threshold.

In some embodiments, rather than receiving a command from the client to garbage collect a particular object after it has gone out of scope, each processor in the parallel server may individually determine when an object for which it stores all or a portion of the data has gone out of scope and may reallocate the memory used to store the object or the portion of the object when it has determined that the object is out of scope. This may be done in any suitable way, as the invention is not limited in this respect.

In one embodiment, a copy of the program to be executed may be sent to each processor. Further, in addition to a scientific software computing application executing on the client, each processor in the parallel server may execute the scientific software computing application. Thus, each processor has a full interpreter to process the program. Each processor may use the interpreter (i.e., of the scientific computing software application) and the copy of the program to determine when objects or variables have gone out of scope. When a processor has determined that an object has gone out of scope, it may free the memory used to store its portion of the object.

In some of the example above, routines of a scientific computing software application were overloaded to enable performance of these routines on a parallel server. However, the invention is not limited to use with a scientific software application as the above-described techniques for enabling performance of a routine or process in parallel may be employed with any suitable software entity, such as other types of software application programs, drivers, operating systems, or other software programs.

In some embodiments, routines of the operating system may be overloaded so that functionality provided by the operating system may be performed in parallel. As used herein, the term operating system refers to one or more software programs that control and manage hardware resources and basic system operations. Examples of some operating systems include the Windows™ operating system produced, and sold by Microsoft Corporation, Redmond, Wash., the MAC OS™ operating system, produced and sold by Apple Computer, Inc., Cupertino, Calif., the Solaris™ operating system, produced and sold by Sun Microsystems, Inc., Santa Clara, Calif., and the Linux operating system produced and sold by various vendors.

Figure 6:
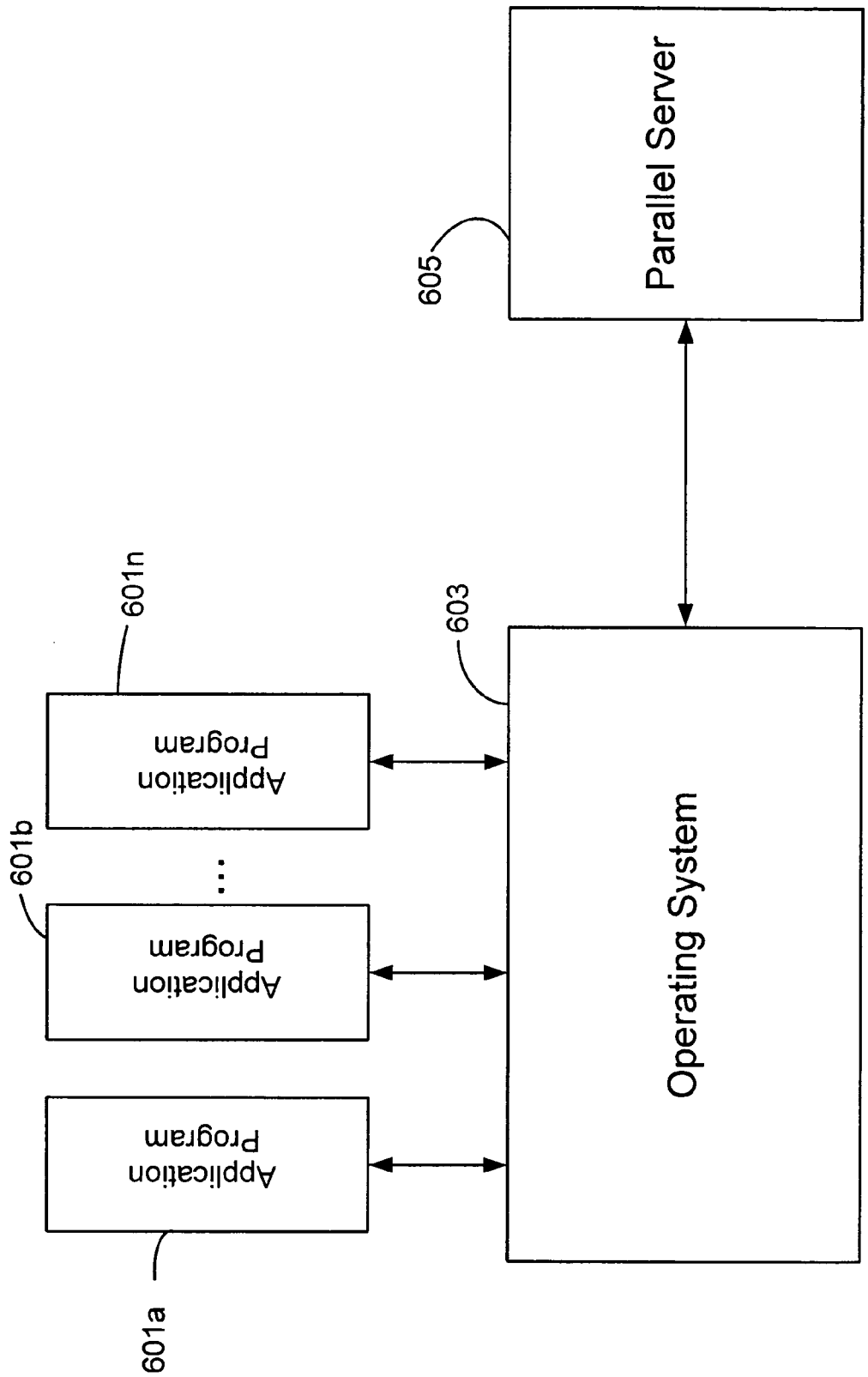
FIG. 6 is a block diagram of an example of a system adaptable to perform a process of an operating system in parallel, in accordance with some embodiments for practicing the teachings herein.

As shown in FIG. 6, application programs 601*a*, 601*b*, . . . , 601*n*, and operating system 603 may execute on a client machine. Operating system 603 may communicate with parallel server 605 to enable performance of some operating system functionality in parallel. It should be appreciated that the client machine may be a machine separate from the parallel server 605 or may be one of the processors of parallel server 605. Routines of operating system 603 may be overloaded such that when the overloaded routine is called a message is sent to parallel server 605 to perform the process of the routine in parallel. This may be done in any suitable way, as the invention is not limited in this respect.

Additionally, any suitable operating system routines may be overloaded to enable any suitable process to be performed in parallel, as the invention is not limited in this respect. In one embodiment, memory management routines may be overloaded. For example, memory management routine(s) of the operating system may be overloaded to enable allocation and destruction of memory on the parallel server. When an application program requests that the operating system allocate memory to it, the operating system's memory allocation routine(s) may be overloaded so that instead of allocating memory on the local processor, memory is allocated on the distributed processor. Similarly, the operating system's memory destruction routine(s) may be overloaded, such that when an application program indicates to the operating system that it no longer needs the memory allocated to it, the memory allocated on the parallel server is reallocated.

Operating systems may provide a variety of other services in addition to memory management and the number of services that operating systems provide to application programs continues to expand. Applicants have appreciated that it may be desirable to perform some of these services in parallel. Thus, the operating system's routines that perform a service may be overloaded using the above-described techniques to enable parallel performance of the service.

In some embodiments, the operating system may make a service available to application programs through an application programming interface (API). An API is a set of function definitions (e.g., function name and parameters) that one software program may call to interact with another software program. Thus, for example, by calling the routines for a particular service, an application program may indicate to the operating system to perform the service. In some embodiments, to enable parallel performance of an operating system service, the functions or routines defined in the API may be overloaded. However, the invention is not limited in this respect, as any suitable function or routine may be overloaded to enable parallel performance.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer environment resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be appreciated that in accordance with several embodiments of the present invention wherein processes are implemented in a computer readable medium, the computer implemented processes may, during the course of their execution, receive input manually (e.g., from a user and/or via external electrical connection).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method of enabling performance of a process in parallel, the method comprising acts of:
   (a) defining a data type capable of referencing data stored on a parallel server;
   (b) defining an overloaded operation that overloads a previously-defined operation, wherein the overloaded operation is defined to, when operating on an instance of the data type, cause a message to be sent, via communication software, to server software executing on the parallel server, wherein the message instructs the parallel server to perform a process in parallel on data stored in memory on the parallel server that is referenced by the instance of the data type, and wherein the previously-defined operation is defined to cause the process to be performed serially; and
   (c) defining a routine that, when the data stored on the parallel server is no longer needed, causes at least a portion of the memory on the parallel server that stores the data to be reallocated.

2. The method of claim 1, wherein the instance of the data type is an object.

3. The method of claim 1, wherein the act (c) comprises an act of:
   including, in the definition of the data type, a definition of a destructor method that is called after the instance of the data type goes out of scope.

4. The method of claim 3, wherein the destructor method is defined to send a command to the parallel server to reallocate the at least a portion of the memory that stores the data.

5. The method of claim 1, wherein the data type is defined in a first programming language and the act (c) further comprises an act of:
   including, in the definition of the data type, a reference to an object defined in a second programming language, different from the first programming language.

6. The method of claim 5, wherein the data type is defined such that when an instance of the data type is created, the object defined in the second programming language is instantiated.

7. The method of claim 6, wherein the object defined in the second programming language includes a destructor method that is called after the object goes out of scope.

8. The method of claim 7, wherein the destructor method, when called, causes a message to be sent to the parallel server to reallocate the at least a portion of the memory that stores the data.

9. The method of claim 7, wherein the destructor method is called by a garbage collection process of the second programming language.

10. The method of claim 9, wherein the garbage collection process is invoked automatically.

11. The method of claim 9, wherein the garbage collection process is invoked explicitly.

12. The method of claim 11, wherein the garbage collection process is invoked explicitly at a pre-defined interval.

13. The method of claim 1, wherein the overloaded operation overloads a previously-defined operation of a scientific computing software application.

14. The method of claim 1, wherein the overloaded operation overloads a previously-defined operation of an operating system.

15. The method of claim 1, wherein the overloaded operation and the previously-defined operation have a same name.

16. The method of claim 15, wherein the overloaded operation and the previously-defined operation are defined to be called with different sets of parameters.

17. The method of claim 15, wherein the overloaded operation and the previously-defined operation are defined to be called with a same set of parameters.

18. The method of claim 1, wherein the overloaded operation, when performed, causes a command to be sent to the parallel server to perform the process in parallel.

19. At least one computer-readable medium encoded with instructions that, when executed on a computer system, perform a method of enabling performance of a process in parallel, the method comprising acts of:
(a) defining a data type capable of referencing data stored on a parallel server in the computer system;
(b) defining an overloaded operation that overloads a previously-defined operation, wherein the overloaded operation is defined to, when operating on an instance of the data type, cause a message to be sent, via communication software, to server software executing on the parallel server, wherein the message instructs the parallel server to perform a process in parallel on data stored in memory on the parallel server that is referenced by the instance of the data type, and wherein the previously-defined operation is defined to cause the process to be performed serially; and
(c) defining a routine that, when the data stored on the parallel server is no longer needed, causes at least a portion of the memory on the parallel server that stores the data to be reallocated.

20. The at least one computer readable medium of claim 19, wherein the instance of the data type is an object.

21. The at least one computer readable medium of claim 19, wherein the act (c) comprises an act of:
including, in the definition of the data type, a definition of a destructor method that is called after the instance of the data type goes out of scope.

22. The at least one computer readable medium of claim 21, wherein the destructor method is defined to send a command to the parallel server to reallocate the at least a portion of the memory that stores the data.

23. The at least one computer readable medium of claim 19, wherein the data type is defined in a first programming language and the act (c) further comprises an act of:
including, in the definition of the data type, a reference to an object defined in a second programming language, different from the first programming language.

24. The at least one computer readable medium of claim 23, wherein the data type is defined such that when an instance of the data type is created, the object defined in the second programming language is instantiated.

25. The at least one computer readable medium of claim 24, wherein the object defined in the second programming language includes a destructor method that is called after the object goes out of scope.

26. The at least one computer readable medium of claim 25, wherein the destructor method, when called, causes a message to be sent to the parallel server to reallocate the at least a portion of the memory that stores the data.

27. The at least one computer readable medium of claim 25, wherein the destructor method is called by a garbage collection process of the second programming language.

28. The at least one computer readable medium of claim 27, wherein the garbage collection process is invoked automatically.

29. The at least one computer readable medium of claim 27, wherein the garbage collection process is invoked explicitly.

30. The at least one computer readable medium of claim 29, wherein the garbage collection process is invoked explicitly at a pre-defined interval.

31. The at least one computer readable medium of claim 19, wherein the overloaded operation overloads a previously-defined operation of a scientific computing software application.

32. The at least one computer readable medium of claim 19, wherein the overloaded operation overloads a previously-defined operation of an operating system.

33. The at least one computer readable medium of claim 19, wherein the overloaded operation and the previously-defined operation have a same name.

34. The at least one computer readable medium of claim 33, wherein the overloaded operation and the previously-defined operation are defined to be called with different sets of parameters.

35. The at least one computer readable medium of claim 33, wherein the overloaded operation and the previously-defined operation are defined to be called with a same set of parameters.

36. The at least one computer readable medium of claim 19, wherein the overloaded operation, when performed, causes a command to be sent to the parallel server to perform the process in parallel.

37. A computer in a computer system comprising the computer, a parallel server, and a communication link that couples the computer and the parallel server, the computer comprising:
an input; and
at least one controller coupled to the output that:
receives, via the input, a definition of a data type capable of referencing data stored on the parallel server; receives, via the input, a definition of an overloaded operation that overloads a previously-defined operation, wherein the overloaded operation is defined to, when operating on an instance of the data type, cause a message to be sent, via communication software, to server software executing on the parallel server, wherein the message instructs the parallel server to perform a process in parallel on data stored in memory on the parallel server that is referenced by the instance of the data type, and wherein the previously-defined operation is defined to cause the process to be performed serially; and
receives, via the input, a definition a routine that, when the data stored on the parallel server is no longer needed, causes at least a portion of the memory on the parallel server that stores the data to be reallocated.

38. The computer of claim 37, wherein the instance of the data type is an object.

39. The computer of claim 37, wherein the definition of the data type includes a definition of a destructor method that is called after the instance of the data type goes out of scope.

40. The computer of claim 39, wherein the destructor method is defined to send a command to the parallel server to reallocate the at least a portion of the memory that stores the data.

41. The computer of claim 37, wherein the data type is defined in a first programming language and wherein the definition of the data type includes a reference to an object defined in a second programming language, different from the first programming language.

42. The computer of claim 41, wherein the data type is defined such that when an instance of the data type is created, the object defined in the second programming language is instantiated.

43. The computer of claim 42, wherein the object defined in the second programming language includes a destructor method that is called after the object goes out of scope.

44. The computer of claim 43, wherein the destructor method, when called, causes a message to be sent to the parallel server to reallocate the at least a portion of the memory that stores the data.

45. The computer of claim 43, wherein the destructor method is called by a garbage collection process of the second programming language.

46. The computer of claim 45, wherein the garbage collection process is invoked automatically.

47. The computer of claim 45, wherein the garbage collection process is invoked explicitly.

48. The computer of claim 47, wherein the garbage collection process is invoked explicitly at a pre-defined interval.

49. The computer of claim 37, wherein the overloaded operation overloads a previously-defined operation of a scientific computing software application.

50. The computer of claim 37, wherein the overloaded operation overloads a previously-defined operation of an operating system.

51. The computer of claim 37, wherein the overloaded operation and the previously-defined operation have a same name.

52. The computer of claim 51, wherein the overloaded operation and the previously-defined operation are defined to be called with different sets of parameters.

53. The computer of claim 51, wherein the overloaded operation and the previously-defined operation are defined to be called with a same set of parameters.

54. The computer of claim 37, wherein the overloaded operation, when performed, causes a command to be sent to the parallel server to perform the process in parallel.

55. A method of performing a process in parallel on a parallel computer, the method comprising acts of:
(a) receiving, at the parallel computer, a first command to perform the process, wherein generation of the first command is caused by performance of an overloaded operation, in a programming language, wherein the overloaded operation overloads a previously-defined operation, and is defined to, when operating on an instance of the data type capable of referencing data stored on the parallel computer, send, via communication software, the first command to server software executing on the parallel computer, and wherein the previously-defined operation process is defined to cause the process to be performed serially;
(b) performing the process in parallel on the parallel computer to generate a result;
(c) storing the result in memory on the parallel computer; and
(d) receiving, at the parallel computer, a second command to reallocate the memory on the parallel computer that stores the result.

56. The method of claim 55, wherein generation of the second command is caused by performance of a destructor method.

57. The method of claim 56, wherein the destructor method is called by a garbage collection process of the second programming language.

58. The method of claim 57, wherein the garbage collection process is invoked automatically.

59. The method of claim 57, wherein the garbage collection process is invoked explicitly.

60. The method of claim 59, wherein the garbage collection process is invoked explicitly at a pre-defined interval.

61. The method of claim 56, wherein the overloaded operation overloads a previously-defined operation of a scientific computing software application.

62. The method of claim 56, wherein the overloaded operation overloads a previously-defined operation of an operating system.

63. The method of claim 56, wherein the overloaded operation and the previously-defined operation have a same name.

64. The method of claim 63, wherein the overloaded operation and the previously-defined operation are defined to be called with different sets of parameters.

65. The method of claim 63, wherein the overloaded operation and the previously-defined operation are defined to be called with a same set of parameters.

66. The method of claim 56, wherein the overloaded operation, when performed, causes a command to be sent to the parallel server to perform the process in parallel.

67. At least one computer readable medium encoded with instructions that, when executed on a computer system, perform a method of performing a process in parallel on a parallel computer, the method comprising acts of:
(a) receiving, at the parallel computer, a first command to perform the process, wherein generation of the first command is caused by performance of an overloaded operation, in a programming language, wherein the overloaded operation overloads a previously-defined operation, and is defined to, when operating on an instance of the data type capable of referencing data stored on the parallel computer, send, via communication software, the first command to server software executing on the parallel computer, and wherein the previously-defined operation is defined to cause the process to be performed serially;
(b) performing the process in parallel on the parallel computer to generate a result;
(c) storing the result in memory on the parallel computer; and
(d) receiving, at the parallel computer, a second command to reallocate the memory on the parallel computer that stores the result.

68. The at least one computer readable medium of claim 67, wherein generation of the second command is caused by performance of a destructor method.

69. The at least one computer readable medium of claim 68, wherein the destructor method is called by a garbage collection process of the second programming language.

70. The at least one computer readable medium of claim 69, wherein the garbage collection process is invoked automatically.

71. The at least one computer readable medium of claim 69, wherein the garbage collection process is invoked explicitly.

72. The at least one computer readable medium of claim 71, wherein the garbage collection process is invoked explicitly at a pre-defined interval.

73. The at least one computer readable medium of claim 67, wherein the overloaded operation overloads a previously-defined operation of a scientific computing software application.

74. The at least one computer readable medium of claim 67, wherein the overloaded operation overloads a previously-defined operation of an operating system.

75. The at least one computer readable medium of claim 67, wherein the overloaded operation and the previously-defined operation have a same name.

76. The at least one computer readable medium of claim 75, wherein the overloaded operation and the previously-defined operation are defined to be called with different sets of parameters.

77. The at least one computer readable medium of claim 75, wherein the overloaded operation and the previously-defined operation are defined to be called with a same set of parameters.

78. The at least one computer readable medium of claim 67, wherein the overloaded operation, when performed, causes a command to be sent to the parallel server to perform the process in parallel.

79. A parallel computer comprising:
an input; and
at least one controller, coupled to the input, that:
receives, via the input, a first command to perform a process, wherein generation of the first command is caused by performance of an overloaded operation, in a programming language, wherein the overloaded operation overloads a previously-defined operation, and wherein the previously-defined operation, and is defined to, when operating on an instance of the data type capable of referencing data stored on the parallel computer, send, via communication software, the first command to server software executing on the parallel computer, is defined to cause the process to be performed serially;
performs the process in parallel to generate a result;
stores the result in memory on the parallel computer; and
receives, via the input, a second command to reallocate the memory on the parallel computer that stores the result.

80. The parallel computer of claim 79, wherein generation of the second command is caused by performance of a destructor method.

81. The parallel computer of claim 80, wherein the destructor method is called by a garbage collection process of the second programming language.

82. The parallel computer of claim 81, wherein the garbage collection process is invoked automatically.

83. The parallel computer of claim 81, wherein the garbage collection process is invoked explicitly.

84. The parallel computer of claim 83, wherein the garbage collection process is invoked explicitly at a pre-defined interval.

85. The parallel computer of claim 79, wherein the overloaded operation overloads a previously-defined operation of a scientific computing software application.

86. The parallel computer of claim 79, wherein the overloaded operation overloads a previously-defined operation of an operating system.

87. The parallel computer of claim 79, wherein the overloaded operation and the previously-defined operation have a same name.

88. The parallel computer of claim 87, wherein the overloaded operation and the previously-defined operation are defined to be called with different sets of parameters.

89. The parallel computer of claim 87, wherein the overloaded operation and the previously-defined operation are defined to be called with a same set of parameters.

90. The parallel computer of claim 79, wherein the overloaded operation, when performed, causes a command to be sent to the parallel server to perform the process in parallel.

91. A method of enabling performance of a process in parallel on a parallel server, the method comprising an act of:
defining an overloaded operation that overloads a previously-defined operation of an operating system, wherein the overloaded operation is defined to, when operating on an instance of a data type capable of referencing data stored on the parallel server, cause a message to be sent via communication software to server software executing on the parallel server, wherein the message instructs the parallel server to perform a process to be performed in parallel on data that is referenced by the instance of the data type and is stored in memory on the parallel server, and wherein the previously-defined operation is defined to cause the process to be performed serially.

92. The method of claim 91, further comprising an act of:
defining a routine that, when the data stored on the parallel server is no longer needed, causes at least a portion of the memory on the parallel server that stores the data to be reallocated.

93. The method of claim 92, wherein the routine that causes the at least a portion of the memory on the parallel server that stores the data to be reallocated is a destructor method.

94. The method of claim 93, wherein the destructor method is defined to send a command to the parallel server to reallocate the at least a portion of the memory that stores the data.

95. The method of claim 93, wherein the destructor method is called by a garbage collection process of the second programming language.

96. The method of claim 95, wherein the garbage collection process is invoked automatically.

97. The method of claim 95, wherein the garbage collection process is invoked explicitly.

98. The method of claim 91, wherein the overloaded operation and the previously-defined operation have a same name.

99. The method of claim 98, wherein the overloaded operation and the previously-defined operation are defined to be called with different sets of parameters.

100. The method of claim 98, wherein the overloaded operation and the previously-defined operation are defined to be called with a same set of parameters.

101. The method of claim 91, wherein the overloaded operation, when performed, causes a command to be sent to the parallel server to perform the process in parallel.

102. At least one computer readable medium encoded with instructions that, when executed on a computer system, perform a method of enabling performance of a process in parallel on a parallel server, the method comprising an act of:
defining an overloaded operation that overloads a previously-defined operation of an operating system, wherein the overloaded operation is defined to, when operating on an instance of a data type capable of referencing data stored on the parallel server, cause a message to be sent via communication software to server software executing on the parallel server, wherein the message instructs the parallel server to perform a process to be performed in parallel on data that is referenced by the instance of the data type and is stored in memory on the parallel server, and wherein the previously-defined operation is defined to cause the process to be performed serially.

103. The at least one computer readable medium of claim 102, wherein the method further comprises an act of:

defining a routine that, when the data stored on the parallel server is no longer needed, causes at least a portion of the memory on the parallel server that stores the data to be reallocated.

104. The at least one computer readable medium of claim 103, wherein the routine that causes the at least a portion of the memory on the parallel server that stores the data to be reallocated is a destructor method.

105. The at least one computer readable medium of claim 104, wherein the destructor method is defined to send a command to the parallel server to reallocate the at least a portion of the memory that stores the data.

106. The at least one computer readable medium of claim 104, wherein the destructor method is called by a garbage collection process of the second programming language.

107. The at least one computer readable medium of claim 106, wherein the garbage collection process is invoked automatically.

108. The at least one computer readable medium of claim 106, wherein the garbage collection process is invoked explicitly.

109. The at least one computer readable medium of claim 102, wherein the overloaded operation and the previously-defined operation have a same name.

110. The at least one computer readable medium of claim 109, wherein the overloaded operation and the previously-defined operation are defined to be called with different sets of parameters.

111. The at least one computer readable medium of claim 109, wherein the overloaded operation and the previously-defined operation are defined to be called with a same set of parameters.

112. The at least one computer readable medium of claim 102, wherein the overloaded operation, when performed, causes a command to be sent to the parallel server to perform the process in parallel.

113. A computer in a computer system comprising the computer, a parallel server, and a communication link coupling the computer and the parallel server, the computer comprising:
    an input; and
    at least one controller, coupled to the input, that:
        receives a definition of an overloaded operation that overloads a previously-defined operation of an operating system, wherein the overloaded operation is defined to, when operating on an instance of the data type capable of referencing data stored on the parallel server, cause a message to be sent via communication software to server software executing on the parallel server, wherein the message instructs the parallel server to perform a process to be performed in parallel on data that is referenced by the instance of the data type and is stored in memory on the parallel server, and wherein the previously-defined operation is defined to cause the process to be performed serially.

114. The computer of claim 113, wherein the at least one controller receives, via the input, a definition of a routine that, when the data stored on the parallel server is no longer needed, causes at least a portion of the memory on the parallel server that stores the data to be reallocated.

115. The computer of claim 114, wherein the routine that causes the at least a portion of the memory on the parallel server that stores the data to be reallocated is a destructor method.

116. The computer of claim 115, wherein the destructor method is defined to send a command to the parallel server to reallocate the at least a portion of the memory that stores the data.

117. The computer of claim 115, wherein the destructor method is called by a garbage collection process of the second programming language.

118. The computer of claim 117, wherein the garbage collection process is invoked automatically.

119. The computer of claim 117, wherein the garbage collection process is invoked explicitly.

120. The computer of claim 113, wherein the overloaded operation and the previously-defined operation have a same name.

121. The computer of claim 120, wherein the overloaded operation and the previously-defined operation are defined to be called with different sets of parameters.

122. The computer of claim 120, wherein the overloaded operation and the previously-defined operation are defined to be called with a same set of parameters.

123. The computer of claim 113, wherein the overloaded operation, when performed, causes a command to be sent to the parallel server to perform the process in parallel.

* * * * *